(12) United States Patent
Kremza et al.

(10) Patent No.: US 10,523,076 B2
(45) Date of Patent: Dec. 31, 2019

(54) METHOD OF MAKING MULTI-TURN COILS

(71) Applicant: VOITH PATENT GMBH, Heidenheim (DE)

(72) Inventors: Inna Kremza, Mississauga (CA); Jeff Fenwick, Burlington (CA)

(73) Assignee: Voith Patent GmbH, Heidenheim (DE)

( * ) Notice: Subject to any disclaimer, the term of this patent is extended or adjusted under 35 U.S.C. 154(b) by 102 days.

(21) Appl. No.: 15/569,899

(22) PCT Filed: Apr. 27, 2015

(86) PCT No.: PCT/EP2015/059000
§ 371 (c)(1),
(2) Date: Oct. 27, 2017

(87) PCT Pub. No.: WO2016/173608
PCT Pub. Date: Nov. 3, 2016

(65) Prior Publication Data
US 2018/0109157 A1    Apr. 19, 2018

(51) Int. Cl.
| | |
|---|---|
| *H02K 15/04* | (2006.01) |
| *H02K 3/34* | (2006.01) |
| *H02K 3/50* | (2006.01) |
| *H02K 3/38* | (2006.01) |
| *H02K 15/06* | (2006.01) |
| *H02K 15/12* | (2006.01) |
| *H02K 15/10* | (2006.01) |

(52) U.S. Cl.
CPC ............... *H02K 3/34* (2013.01); *H02K 3/38* (2013.01); *H02K 3/505* (2013.01); *H02K 15/04* (2013.01); *H02K 15/0435* (2013.01); *H02K 15/065* (2013.01); *H02K 15/12* (2013.01); *H02K 15/105* (2013.01)

(58) Field of Classification Search
CPC .... H02K 15/00; H02K 15/04; H02K 15/0414; H02K 15/0435; H02K 3/32; H02K 3/34; H02K 15/06; H02K 3/50; H02K 3/505; H01B 3/04; Y10T 29/49009
USPC ............. 29/596, 564.1, 603.23, 603.26, 732; 174/120 C, 120 R, 138 E; 310/201, 260, 310/270; 264/272.19
See application file for complete search history.

(56) References Cited

U.S. PATENT DOCUMENTS

| | | | | |
|---|---|---|---|---|
| 2,677,067 | A | * | 4/1954 | Johnson ................. H02K 3/505 |
| | | | | 310/260 |
| 2,757,298 | A | | 7/1956 | Botts et al. |
| 3,710,437 | A | * | 1/1973 | Kipple .................. H02K 15/12 |
| | | | | 29/596 |

(Continued)

FOREIGN PATENT DOCUMENTS

| | | | | |
|---|---|---|---|---|
| DE | 2422019 A1 | * | 11/1975 | ............... H02K 3/50 |
| JP | 53-032302 A | * | 3/1978 | ............. H02K 15/12 |

(Continued)

*Primary Examiner* — Burton S Mullins
(74) *Attorney, Agent, or Firm* — Laurence A. Greenberg; Werner H. Stemer; Ralph E. Locher

(57) ABSTRACT

A method of fabricating a dynamoelectric machine utilizing multi-turn coils includes manufacturing a multi-turn coil having turn and ground insulation and installation of the coil into the stator core of the machine. The loop regions of the coil have no ground insulation during installation and the ground insulation at the loop regions is completed after installation of the coil.

5 Claims, 8 Drawing Sheets

(56) References Cited

U.S. PATENT DOCUMENTS

| | | | | |
|---|---|---|---|---|
| 3,750,273 | A | | 8/1973 | Beddows |
| 3,914,860 | A | * | 10/1975 | Schuler .................... H02K 3/38 |
| | | | | 29/596 |
| 4,151,434 | A | * | 4/1979 | Zona ........................ H02K 3/38 |
| | | | | 310/71 |
| 4,279,944 | A | * | 7/1981 | Laskaris .................. H02K 3/24 |
| | | | | 156/173 |
| 4,616,407 | A | | 10/1986 | Tamaki et al. |
| 4,723,083 | A | * | 2/1988 | Elton ..................... H02K 15/105 |
| | | | | 310/260 |
| 6,481,089 | B1 | * | 11/2002 | Enomoto ............. H02K 15/045 |
| | | | | 29/596 |
| 8,097,996 | B1 | * | 1/2012 | Rao ......................... H02K 3/34 |
| | | | | 310/215 |
| 9,009,949 | B1 | * | 4/2015 | Thaxton ................. H02K 15/12 |
| | | | | 29/596 |

FOREIGN PATENT DOCUMENTS

| | | | | | |
|---|---|---|---|---|---|
| JP | | 57-080249 | * | 5/1982 | ............... H02K 3/40 |
| JP | | 59-053052 | A * | 3/1984 | ............... H02K 3/24 |
| JP | | 60-002070 | A * | 1/1985 | ............... H02K 3/24 |

* cited by examiner

METHOD OF MAKING MULTI-TURN COILS

BACKGROUND OF THE INVENTION

Field of the Invention

This invention relates to multi-turn coils for dynamoelectric machines and to a method of fabricating machines utilizing the multi-turn coils. More particularly, the invention relates to the forming and insulating of multi-turn coils and the insertion of multi-turn coils into the machine slots.

Multi-turn coils carry electrical current and are embedded in the slots of the stator core of dynamoelectric machines. They operate at a voltage that is elevated above the stator core. The latter is considered to be at ground potential. The two sides or legs of each coil are located in two separate slots in the core. The multi-turn winding is manufactured from a conductor of one or more strands (typically but not limited to copper) and an electrical insulation system. The insulation consists of wire insulation, turn insulation (to prevent turn-to-turn electrical short circuits) and ground insulation (to insulate the coil from the grounded stator core). During installation of the coils, the conductors and insulation system have to be flexed and will be deformed. Excessive stress in the coils may cause cracks or other damage in the insulation system which can lead to electrical test failures or failures in service caused by electrical, thermal and mechanical stresses during operation. This problem is well known and serval solutions have been proposed in prior art. As an example we want to mention N. A. Beddows' U.S. Pat. No. 3,750,273.

SUMMARY OF THE INVENTION

The instant application solves the problem in a different manner. Although this invention is described with particularity in the appended claims, a more complete understanding of the invention may be obtained from the following detailed description of the specific embodiments taken in conjunction with the appended drawings wherein:

DESCRIPTION OF THE INVENTION

The different embodiments of the current invention result from different methods of insulation which cause slight modifications of the inventive method. One difference consists in the way the conductors are initially insulated. Some conductors are initially insulated in a way that the wire insulation already includes the turn insulation and therefore during winding no turn insulation has to be applied. The other difference belongs to the insulation process used for the turn and ground insulation. One process is using a vacuum pressure impregnation (VPI) system for impregnating the insulation tapes with resin. In the other process the resin is contained in the tapes themselves. If not otherwise stated the following description relies on conductors which need an additional turn insulation and on using a VPI system.

Figure 1:
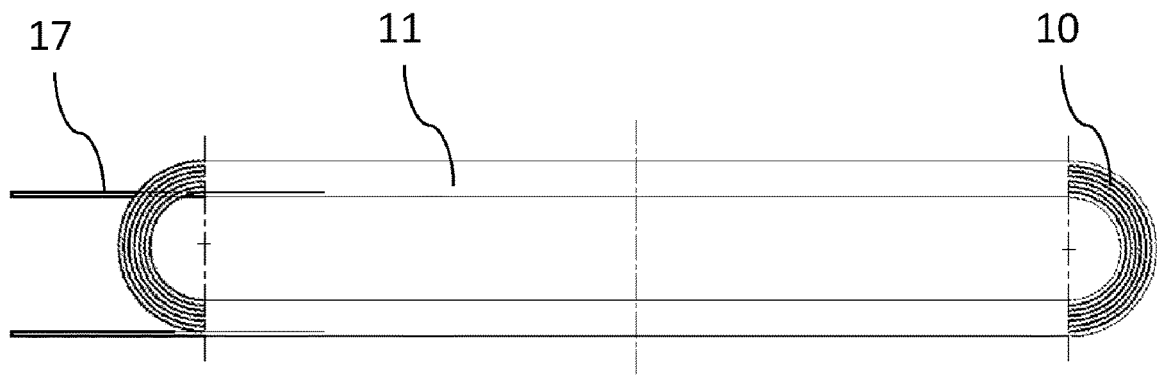
FIG. 1 shows a multi-turn coil after winding and application of the turn insulation.
Figure 2:
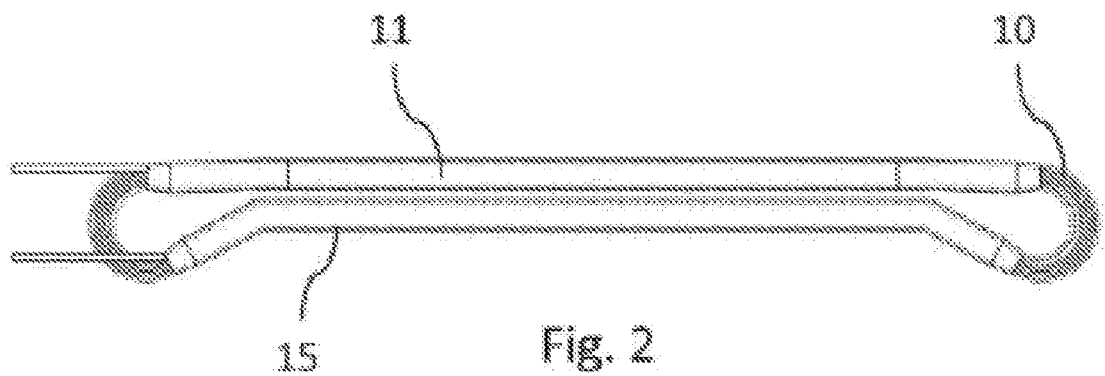
FIG. 2 shows a multi-turn coil after forming and application of ground insulation in accordance with this invention.
Figure 4:
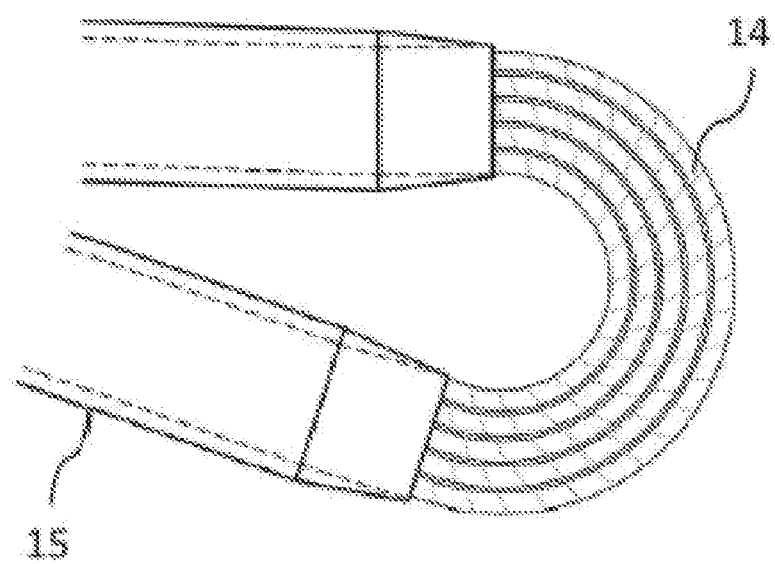
FIG. 4 shows the loop region of a multi-turn coil after restoration of the turn insulation in accordance with this invention.
Figure 5:
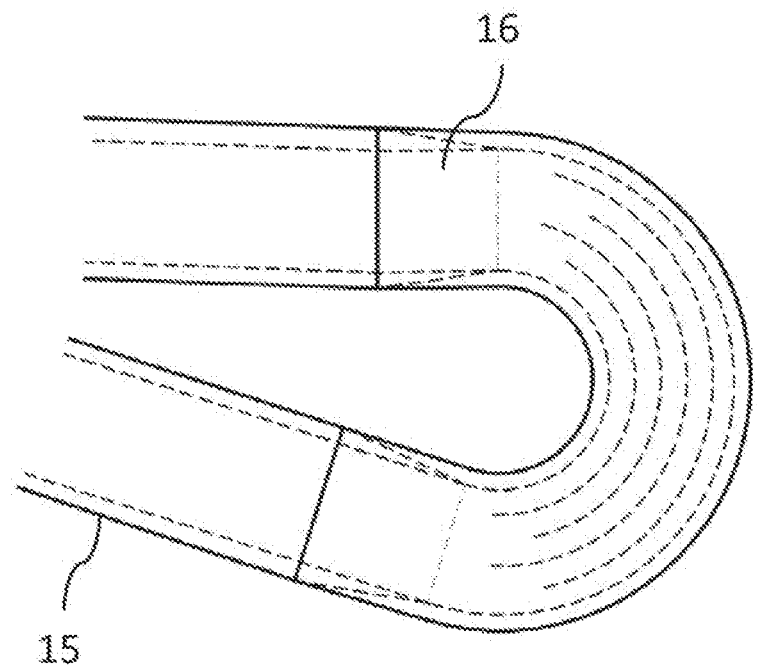
FIG. 5 shows the loop region of a multi-turn coil after completion of the ground insulation in accordance with this invention.

A multi-turn coil in accordance with this invention is made by initially winding an insulated conductor where the conductor is insulated by the so called wire insulation. FIG. 1 shows a multi-turn coil after winding and application of the turn insulation 17. The straight slot region is indicated by 11 and the bent loop region is indicated by 10. FIG. 2 shows a multi-turn coil after forming and application of the ground insulation 15 to the slot regions 11. The ground insulation 15 extends somewhat above the straight slot regions 11 but the bent loop regions 10 are free of ground insulation. The details concerning the loop region are shown in FIGS. 3 to 5.

The current inventive method is based on the idea to apply the complete insulation system to the slot regions of the coil only before the coil is inserted in the stator core, whereas the loop regions are left without at least the ground insulation before insertion. The insulation in the loop regions will be completed after insertion of the coils into the stator core slots.

Figure 3:
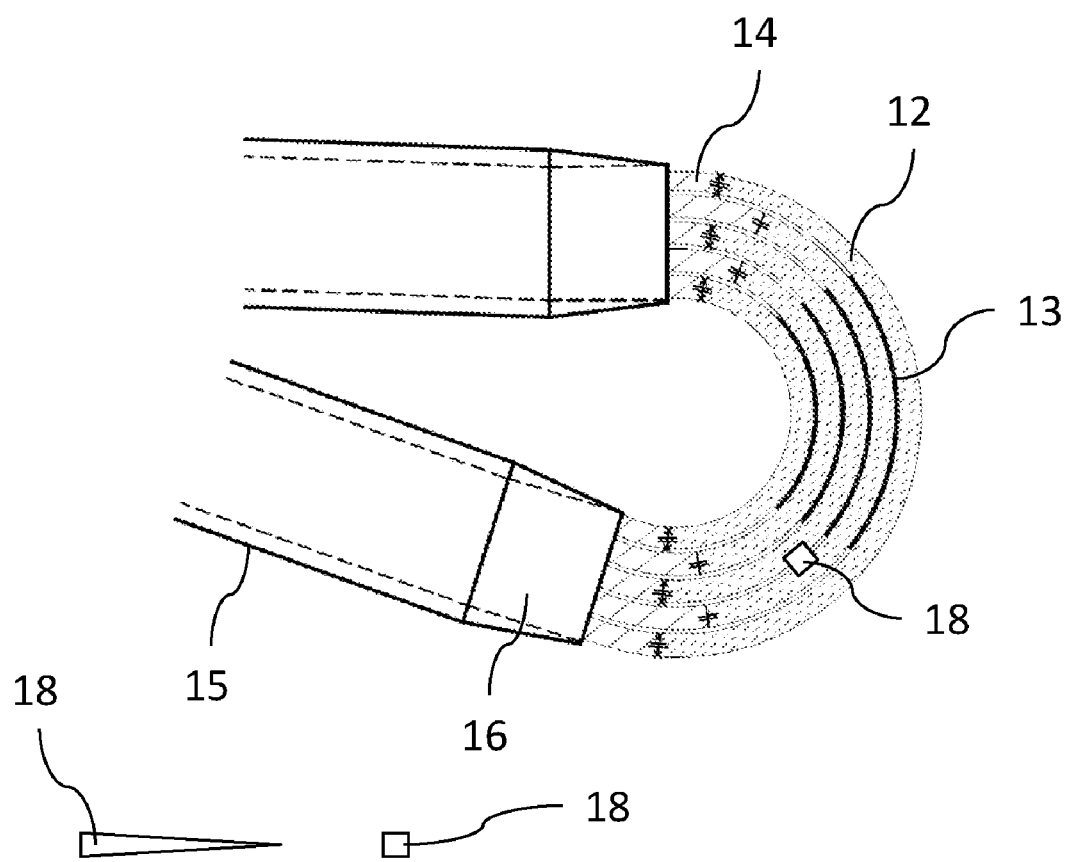
FIG. 3 shows the loop region of a multi-turn coil after removal of the turn insulation in accordance with this invention.

FIG. 3 shows the loop region of a multi-turn coil in the same situation as in FIG. 2. The ground insulation 15 finishes with a taper 16 before the loop region. In the loop region the turn insulation 14 has also been removed. A conductor without turn insulation is indicated by 12. Spacers 13 are located between the conductors in the loop regions. Preferably the spacers are made of flexible material. The spacers have been placed in these positions during winding of the coil. It is expedient if the spacers 13 are wrapped in release tape or coated accordingly for easy removal of the spacers. The starting points where the turn insulation has been removed are staggered on subsequent turns to facilitate the final application of turn insulation by distributing the insulation build-up after the coil has been inserted in the stator core slot.

After the coils have been installed in the stator core, the insulation of the loop regions will be completed. FIG. 4 shows the loop region of a multi-turn coil after installation into the stator core slots and restoration of the turn insulation 14. The turn insulation tape has been wound around the conductor turns to overlap the existing turn insulation. FIG.

5 shows the loop region of a multi-turn coil after completion of the ground insulation 15. This has been done by application of ground insulation tape with the resin brushed in between and over the coil loop region to overlap with the existing taper on both sides.

Figure 6:
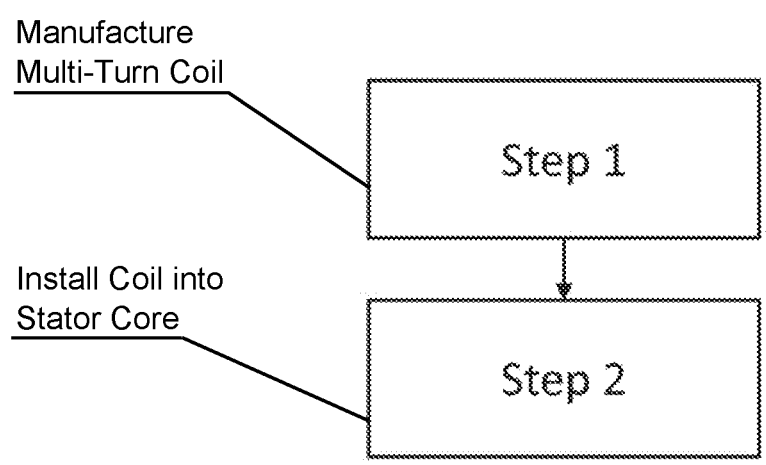
FIG. 6 is a flow chart illustrating in block diagram form a method of manufacturing and of installating a multi-turn coil in accordance with this invention.

FIG. 6 shows the two major steps of the current inventive method, where step 1 comprises the manufacturing of a multi-turn coil and step 2 comprises the installation of the coil into the stator core. According to the current invention step 1 leaves the loop regions of the coil at least without ground insulation. In one embodiment of the invention also the turn insulation is removed within the loop regions. At the end of step 2 the insulation of the multi-turn coil is completed in the loop regions.

Figure 7:
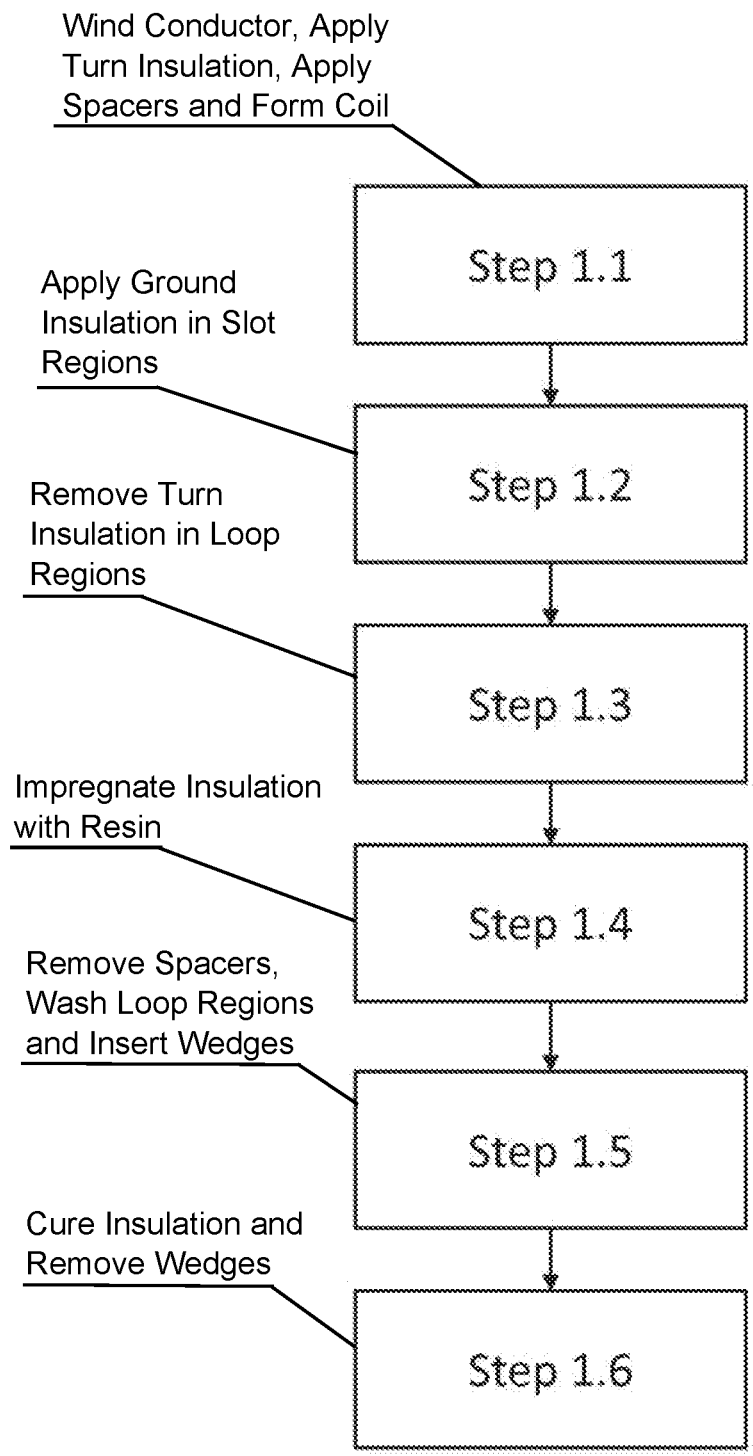
FIG. 7 is a flow chart illustrating in block diagram form a method of manufacturing a multi-turn coil in accordance with this invention.

FIG. 7 shows sub-steps of step 1 from FIG. 6 for one embodiment of the current invention. This embodiment applies to the case where the conductors have to be insulated with separate turn insulation and VPI is used. Step 1.1 comprises winding of the conductor, application of turn insulation, application of spacers between the turns within the loop regions and forming the coil. Step 1.2 comprises the application of ground insulation within the slot regions. Step 1.3 comprises the removal of turn insulation within the loop regions. Step 1.4 comprises the impregnation of the insulation with resin. Step 1.5 comprises removal of the spacers, washing the loop regions (removal of any resin) and insertion of wedges 18 shown in FIG. 3 to maintain the spacing between the turns. It is expedient if the wedges are wrapped in release tape or coated accordingly to be easily removed. Step 1.6 comprises curing of the insulation and removal of the wedges.

Figure 8:
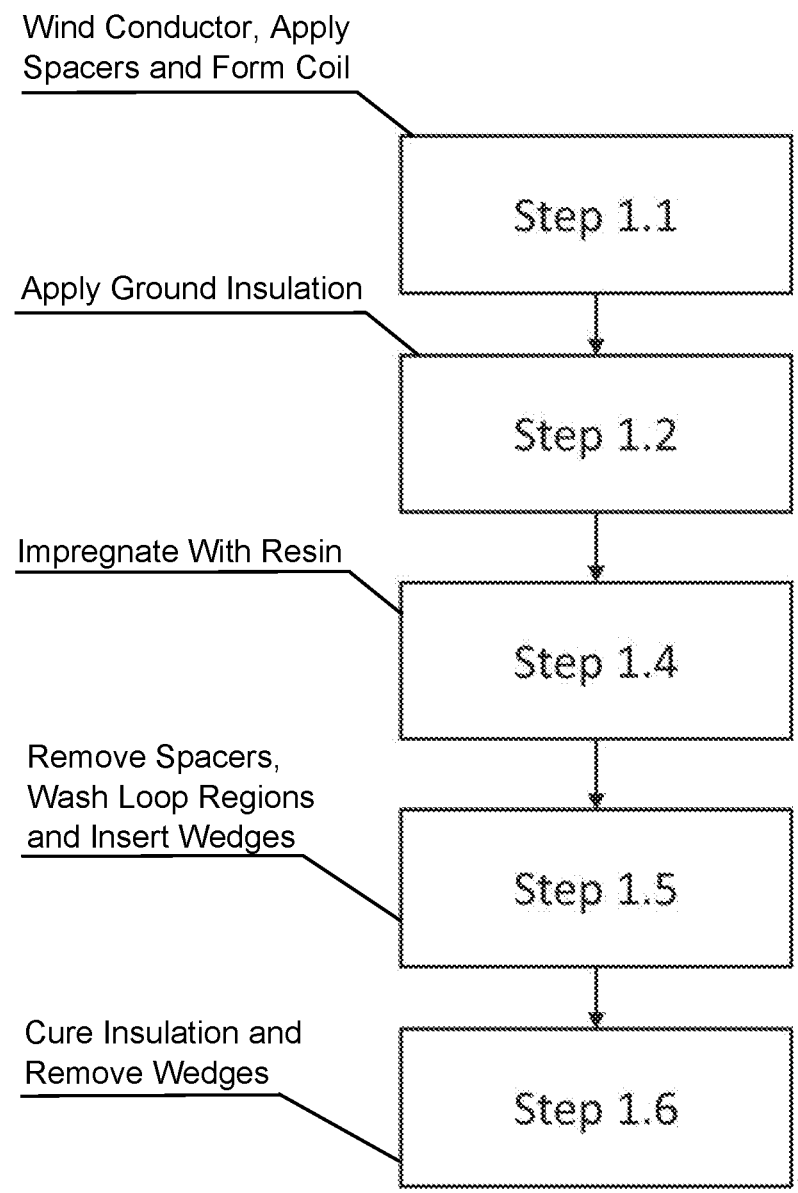
FIG. 8 is a flow chart illustrating in block diagram form another embodiment of a method of manufacturing a multi-turn coil in accordance with this invention.

FIG. 8 shows sub-steps of step 1 in FIG. 6 for one embodiment of the current invention. This embodiment applies to the case where the conductors do not have to be insulated with separate turn insulation and VPI is used. Step 1.1 comprises winding of the conductor, application of spacers between the turns within the loop regions and forming the coil. Step 1.2 comprises the application of ground insulation within the slot regions. Step 1.4 comprises the impregnation of the insulation with resin. Step 1.5 comprises removal of the spacers, washing the loop regions (removal of any resin) and insertion of wedges to maintain the spacing between the turns. Step 1.6 comprises curing of the insulation and removal of the wedges.

Figure 9:
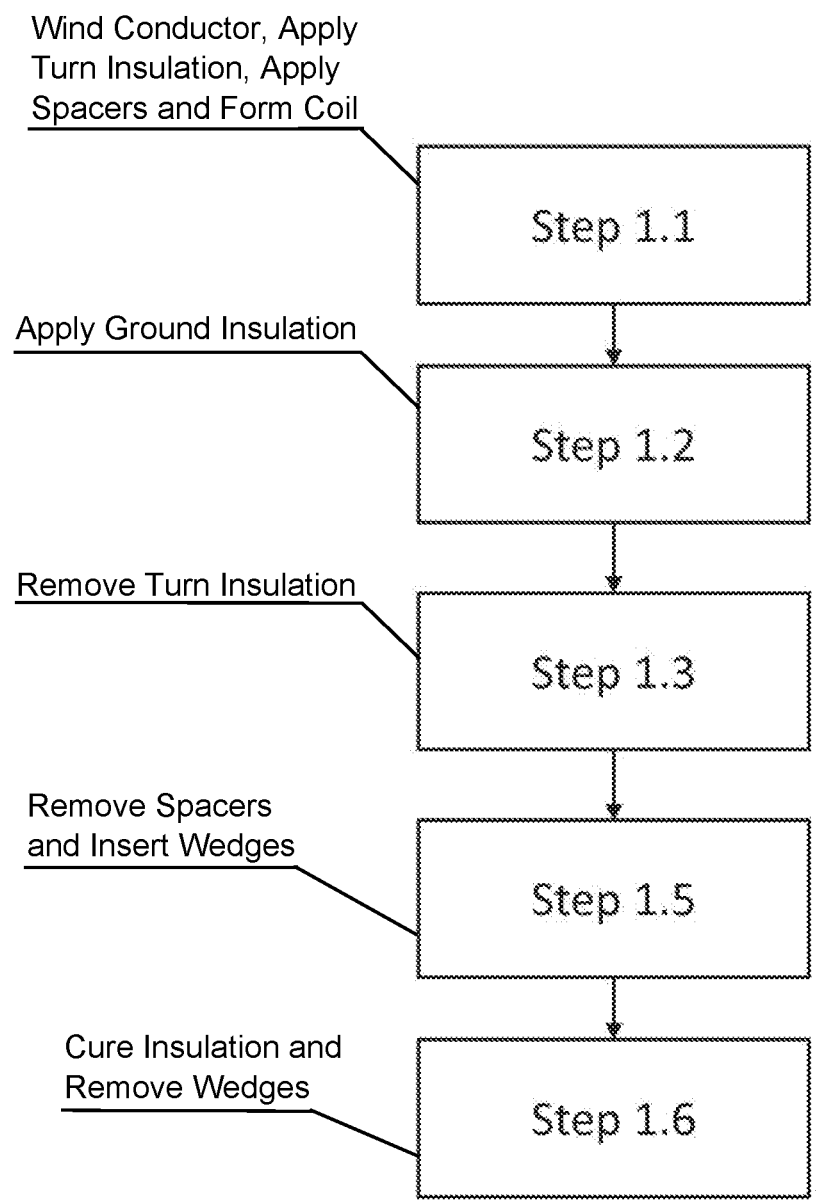
FIG. 9 is a flow chart illustrating in block diagram form another embodiment of a method of manufacturing a multi-turn coil in accordance with this invention.

FIG. 9 shows sub-steps of step 1 in FIG. 6 for one embodiment of the current invention. This embodiment applies to the case where the conductors have to be insulated with separate turn insulation and VPI is not used (resin is contained in the tapes). Step 1.1 comprises winding of the conductor, application of turn insulation, application of spacers between the turns within the loop regions and forming the coil. Step 1.2 comprises the application of ground insulation within the slot regions. Step 1.3 comprises the removal of turn insulation within the loop regions. Step 1.5 comprises removal of the spacers and insertion of wedges to maintain the spacing between the turns. Step 1.6 comprises curing of the insulation and removal of the wedges.

Figure 10:
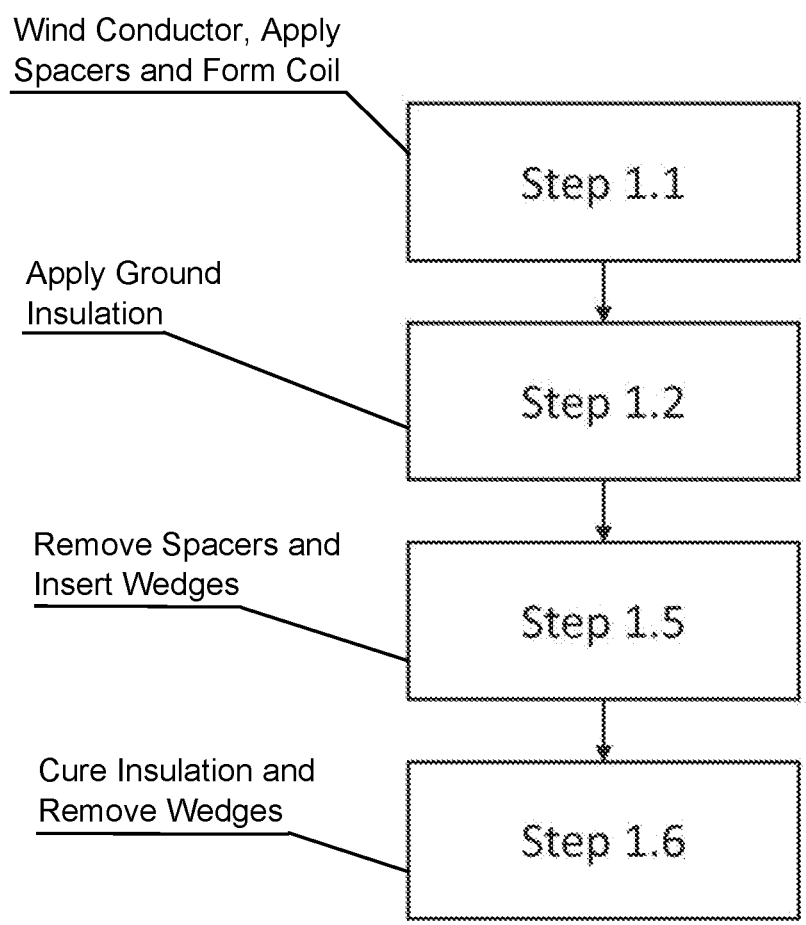
FIG. 10 is a flow chart illustrating in block diagram form a method of installation a multi-turn coil in accordance with this invention.

FIG. 10 shows sub-steps of step 1 in FIG. 6 for one embodiment of the current invention. This embodiment applies to the case where the conductors do not have to be insulated with separate turn insulation and VPI is not used (resin is contained in the tapes). Step 1.1 comprises winding of the conductor, application of spacers between the turns within the loop regions and forming the coil. Step 1.2 comprises the application of ground insulation within the slot regions. Step 1.5 comprises removal of the spacers and insertion of wedges to maintain the spacing between the turns. Step 1.6 comprises curing of the insulation and removal of the wedges.

Figure 11:
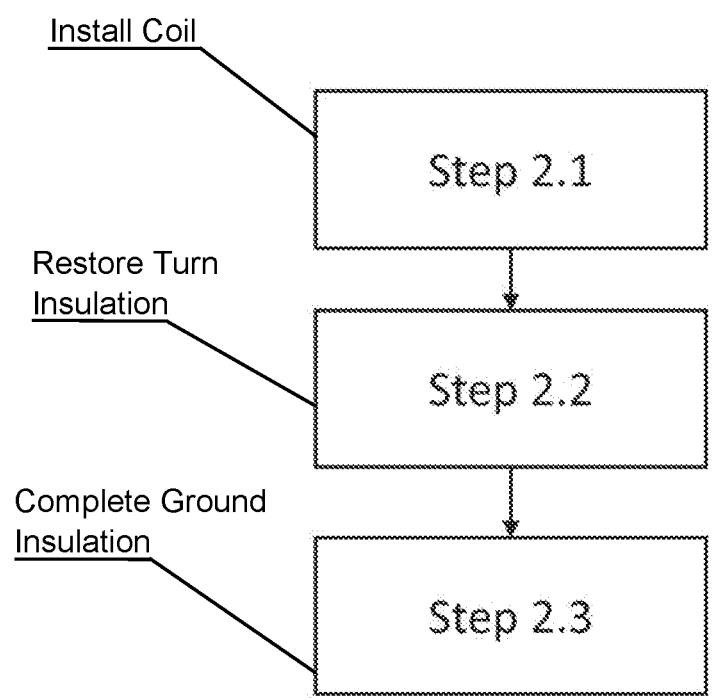
FIG. 11 is a flow chart illustrating in block diagram form another method of installation of a multi-turn coil in accordance with this invention.

FIG. 11 shows sub-steps of step 2 in FIG. 6. Step 2.1 comprises the installation of the coil into the stator core. Step 2.2 comprises the restoration of the turn insulation within the loop regions. Step 2.3 comprises the completion of the ground insulation within the loop regions. The sub-steps of step 2 differ only slightly according to the different embodiments of the current invention. In the case where the conductors have to be insulated with separate turn insulation step 2.2 means the application of turn insulation tape according to FIG. 4. In the case where the wire insulation comprises the turn insulation step 2.2, repairing the wire insulation (including turn insulation) is required where it is damaged during installation of the coil into the stator core.

Finally it has to be stated that steps 2.2 and 2.3 are performed using an insulation system which cures at room temperature.

The invention claimed is:

1. A method of fabricating a dynamoelectric machine utilizing multi-turn coils, the method comprising the following steps:
    manufacturing a multi-turn coil including turn insulation and ground insulation;
    sequentially applying spacers between turns within loop regions of the coil, then removing the spacers, then inserting wedges and then removing the wedges;
    then installing the coil into a stator core of the machine, the loop regions having no ground insulation during the installing step; and
    completing the ground insulation at the loop regions after installing the coil.

2. The method of fabricating a dynamoelectric machine utilizing multi-turn coils according to claim 1, which further comprises carrying out the following steps in sequential order:
    winding a conductor,
    applying turn insulation,
    applying the spacers between the turns within the loop regions,
    forming the coil,
    applying ground insulation within slot regions,
    removing turn insulation within the loop regions,
    impregnating the insulation with resin,
    removing the spacers,
    washing the loop regions,
    inserting the wedges,
    curing the insulation,
    removing the wedges,
    installing the coil into the stator core,
    restoring the turn insulation within the loop regions, and
    completing the ground insulation within the loop regions.

3. The method of fabricating a dynamoelectric machine utilizing multi-turn coils according to claim 1, which further comprises carrying out the following steps in sequential order:
    winding a conductor,
    applying the spacers between the turns within the loop regions,
    forming the coil,
    applying the ground insulation within slot regions,
    impregnating the insulation with resin,
    removing the spacers,
    washing the loop regions,
    inserting the wedges,
    curing the insulation, removing the wedges,
installing the coil into the stator core,
repairing wire insulation within the loop regions, and
completing the ground insulation within the loop regions.

4. The method of fabricating a dynamoelectric machine utilizing multi-turn coils according to claim 1, which further comprises carrying out the following steps in sequential order:
impregnating insulation tapes with resin,
winding a conductor,
applying turn insulation,
applying spacers between the turns within the loop regions,
forming the coil,
applying ground insulation within slot regions,
removing turn insulation within the loop regions,
removing the spacers,
inserting the wedges,
curing the insulation,
removing the wedges,
installing the coil into the stator core,
restoring the turn insulation within the loop regions, and
completing the ground insulation within the loop regions.

5. The method of fabricating a dynamoelectric machine utilizing multi-turn coils according to claim 1, which further comprises carrying out the following steps in sequential order:
impregnating insulation tapes with resin,
winding of a conductor,
application of spacers between the turns within the loop regions,
forming the coil,
applying the ground insulation within the slot regions,
removing the spacers,
inserting the wedges,
curing the insulation,
removing the wedges,
installing the coil into the stator core,
repairing wire insulation within the loop regions, and
completing the ground insulation within the loop regions.

* * * * *